United States Patent
Cheong et al.

(10) Patent No.: US 11,758,476 B2
(45) Date of Patent: Sep. 12, 2023

(54) NETWORK AND CONTEXT AWARE AP AND BAND SWITCHING

(71) Applicant: Dell Products L.P., Round Rock, TX (US)

(72) Inventors: Minho Cheong, Round Rock, TX (US); Harpreet S. Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 17/168,305

(22) Filed: Feb. 5, 2021

(65) Prior Publication Data
US 2022/0256453 A1    Aug. 11, 2022

(51) Int. Cl.
*H04W 48/20* (2009.01)
*H04W 28/08* (2023.01)

(52) U.S. Cl.
CPC ....... *H04W 48/20* (2013.01); *H04W 28/0835* (2020.05); *H04W 28/0942* (2020.05); *H04W 28/0983* (2020.05)

(58) Field of Classification Search
CPC ............. H04W 48/20; H04W 28/0835; H04W 28/0942; H04W 28/0983; H04W 28/02; H04W 28/08; H04W 28/09; H04W 28/0958; H04W 28/0967; H04W 28/0975; H04W 48/04; H04W 48/06; H04W 52/02; H04W 52/0225; H04W 52/0251; H04W 52/0258; H04W 72/02; H04W 84/12; H04W 84/18; G06N 3/082; G06N 20/00
See application file for complete search history.

(56) References Cited

U.S. PATENT DOCUMENTS

| | | | | |
|---|---|---|---|---|
| 9,055,542 | B2* | 6/2015 | Gage | H04W 52/283 |
| 10,333,807 | B2* | 6/2019 | Egner | H04L 43/0876 |
| 10,939,367 | B1* | 3/2021 | Koshy | H04W 48/16 |
| 11,082,860 | B2* | 8/2021 | Egner | H04W 24/02 |
| 11,277,853 | B2* | 3/2022 | Egner | H04W 16/14 |
| 2015/0222553 | A1* | 8/2015 | Macdonald | H04W 4/40 370/230.1 |
| 2017/0048731 | A1* | 2/2017 | Gibson | G06F 9/5066 |
| 2017/0193315 | A1* | 7/2017 | El-Khamy | G08G 1/054 |
| 2019/0116604 | A1* | 4/2019 | Al-Nahhal | H04W 72/0453 |
| 2021/0006972 | A1* | 1/2021 | Guim Bernat | H04W 4/021 |
| 2021/0103786 | A1* | 4/2021 | Yoshida | G06K 19/06131 |
| 2021/0144517 | A1* | 5/2021 | Guim Bernat | H04W 12/04 |
| 2021/0344612 | A1* | 11/2021 | Files | H04L 67/12 |
| 2022/0053373 | A1* | 2/2022 | Yamawaki | H04L 47/783 |
| 2022/0201577 | A1* | 6/2022 | Narula | H04W 84/12 |
| 2022/0210263 | A1* | 6/2022 | Narula | G06F 3/017 |

(Continued)

*Primary Examiner* — Ahmed Elallam
(74) *Attorney, Agent, or Firm* — Terrile, Cannatti & Chambers; Stephen A. Terrile

(57) ABSTRACT

A system, method, and computer-readable medium are disclosed for performing an intelligent connectivity operation. The intelligent connectivity operation includes: identifying context aware information associated with an information handling system; identifying network infrastructure operational information, the network infrastructure operational information including access point (AP) usage information; and, selecting an access point and a channel within the network infrastructure for use by the information handling system based upon the context aware information and the network infrastructure operational information.

20 Claims, 8 Drawing Sheets

(56) References Cited

U.S. PATENT DOCUMENTS

2022/0210735 A1* 6/2022 Narula .............. H04W 72/1215
2022/0255865 A1* 8/2022 Narula .................... H04L 47/24
2022/0256453 A1* 8/2022 Cheong ............. H04W 28/0835

* cited by examiner

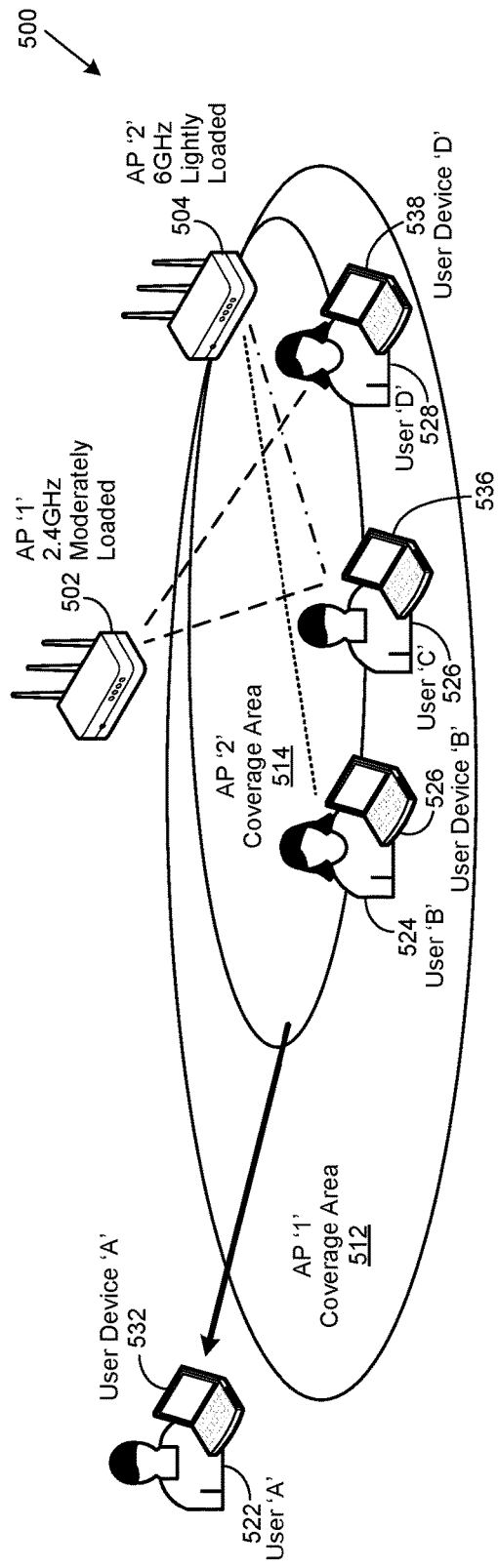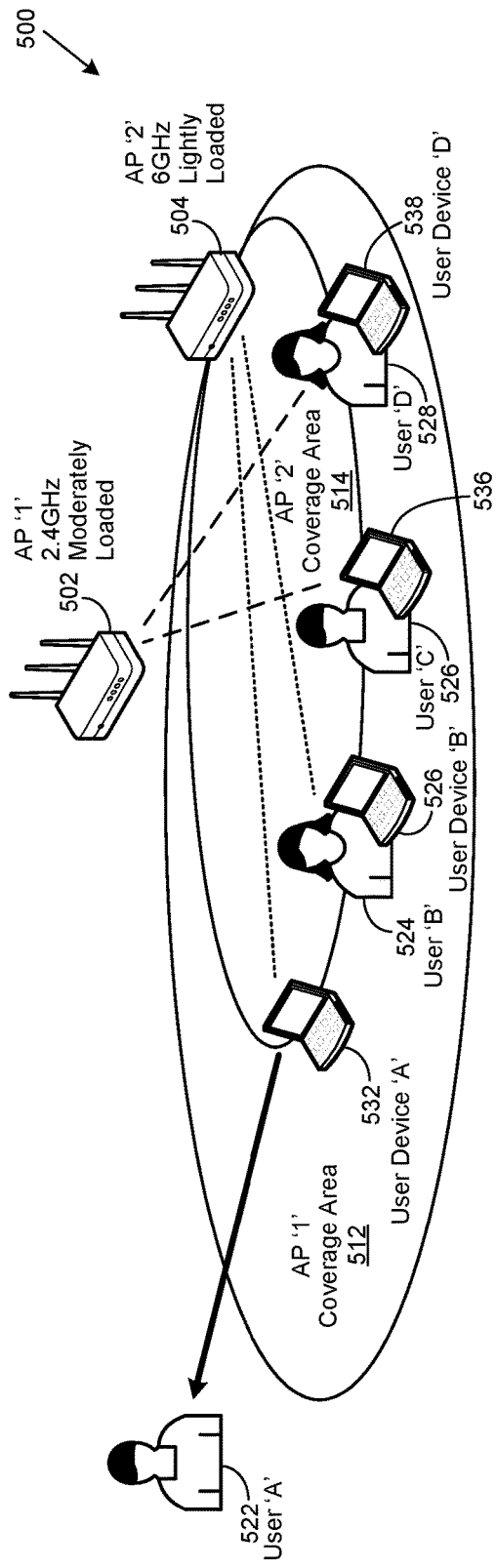
*Figure 5c*
*Figure 5d*

| Contextual Change 602 | Context-Aware Access Point Selection Operation 622 |
|---|---|
| Laptop lid opened or closed 604 | Use directional information to make AP recommendations |
| Platform power management status 606 | Adjust for power consumption and network throughput, and make AP recommendation |
| Initiating or existing no-interrupt mode 608 | Update the threshold value (e.g., AP score) for change |
| User disengaging from using device 610 | Use throughput information for AP recommendation |
| Interactive application in process 612 | Use application context for AP recommendation |
| Initiating or existing application needing higher throughput 614 | Use throughput information for AP recommendation |

*Figure 6*

NETWORK AND CONTEXT AWARE AP AND BAND SWITCHING

BACKGROUND OF THE INVENTION

Field of the Invention

The present invention relates to information handling systems. More specifically, embodiments of the invention relate to performing an intelligent connectivity operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an intelligent connectivity operation, comprising: identifying context aware information associated with an information handling system; identifying network infrastructure operational information, the network infrastructure operational information including access point (AP) usage information; and, selecting an access point and a channel within the network infrastructure for use by the information handling system based upon the context aware information and the network infrastructure operational information.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying context aware information associated with an information handling system; identifying network infrastructure operational information, the network infrastructure operational information including access point (AP) usage information; and, selecting an access point and a channel within the network infrastructure for use by the information handling system based upon the context aware information and the network infrastructure operational information.

In another embodiment the invention relates to a computer-readable storage medium embodying computer program code, the computer program code comprising computer executable instructions configured for: identifying context aware information associated with an information handling system; identifying network infrastructure operational information, the network infrastructure operational information including access point (AP) usage information; and, selecting an access point and a channel within the network infrastructure for use by the information handling system based upon the context aware information and the network infrastructure operational information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5a through 5d show an example of context-aware access point (AP) selection operations;

FIG. 6 shows a table of context changes and associated context-aware AP selection operations.

DETAILED DESCRIPTION

Figure 1:
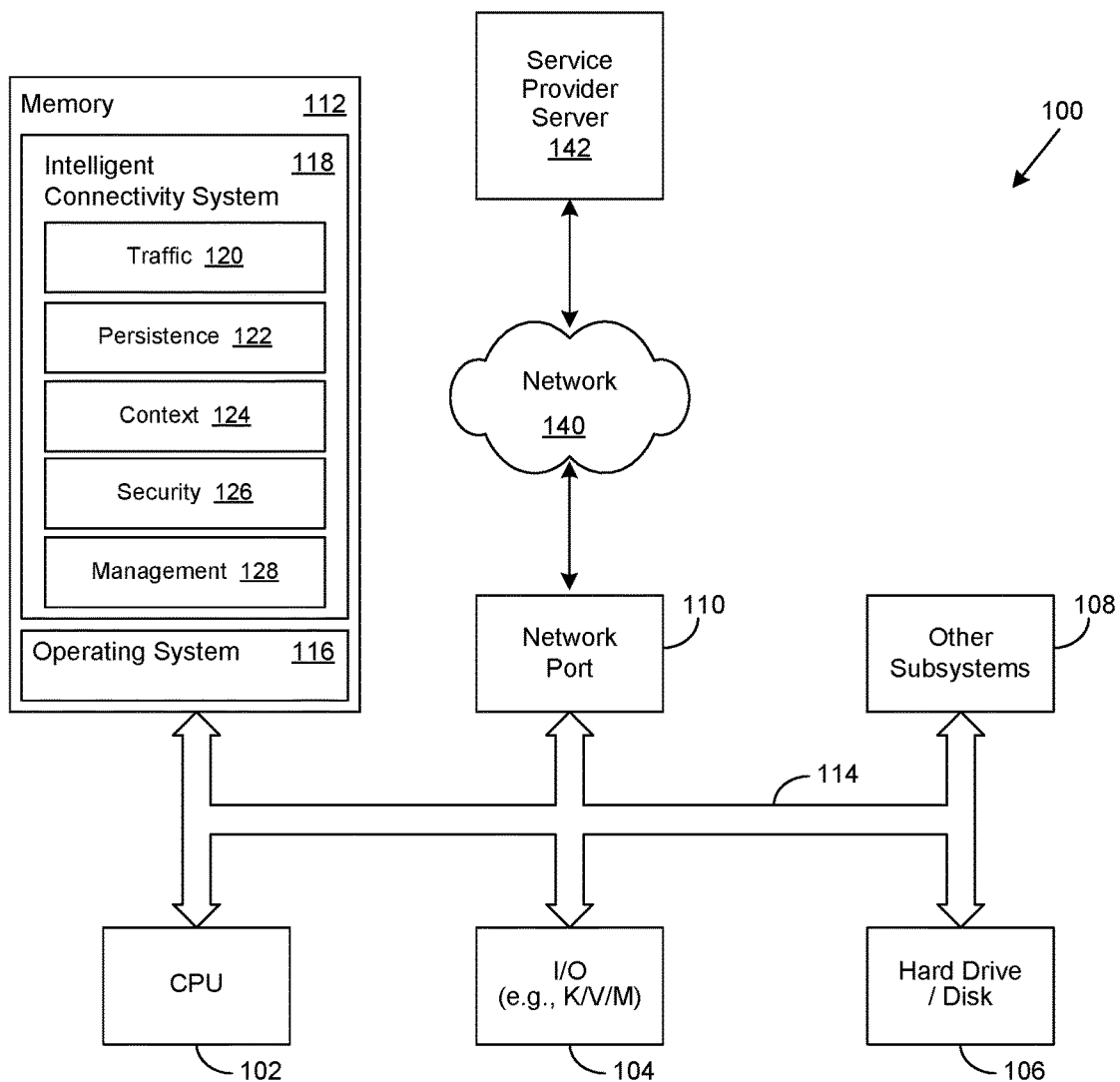
FIG. 1 shows a general illustration of components of an information handling system as implemented in the system and method of the present invention.

A system, method, and computer-readable medium are disclosed for performing an intelligent connectivity operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Various aspects of the invention reflect an appreciation that certain approaches are known for switching a mobile device's connection from one Wireless Fidelity (WiFi) access point (AP) to another based upon Received Signal Strength Information (RSSI) they may provide. Likewise, other known approaches to AP switching include the consideration of certain wireless network infrastructure operational information, such as whether a particular AP is public or private, whether it supports multi-user, multiple-input, multiple-output (MU-MIMO) capabilities, its Wi-Fi contention status, and so forth. One example of the provision of such wireless network infrastructure operational information is Multi-Band Operation (MBO), also commonly known as AGILE MULTIBAND™, developed by the WiFi Alliance (WFA), which provides an approach for making intelligent AP, frequency band, and channel selection decisions. Another example is PASSPOINT®, likewise developed by the WFA, which is an open source protocol that enables mobile devices to discover and authenticate APs, which enables AP roaming with a recommendation of the best AP for a particular client device.

Various aspects of the invention reflect an appreciation that certain other approaches are also known for providing recommendations regarding which AP, frequency band, and channel might provide the best combination of congestion, signal strength, latency, throughput, and so forth for a particular mobile device. Those of skill in the art will be aware that all of these approaches are based upon the assumption that the client device will make the final decision of which AP connection it may use. Currently, that decision is typically made according to a composite AP score that takes into account each AP's configuration and radio characteristics, the quality of the WiFi link it may provide (e.g., RSSI, latency, etc.), loading status, MU-MIMO or not, whitelist/blacklist of applications supported, and so forth. However, currently known approaches for AP selection do not take into account the dynamic status of the device itself, such as its antenna orientation, the state of its power management, and active network traffic needs.

Furthermore, certain aspects of the invention reflect an appreciation that laptop-centric AP selection decisions are often based on a limited amount of WiFi channel information available from other wireless devices. In contrast, the amount of such information available to components of a WiFi infrastructure (e.g., WiFi APs, WiFi controllers, etc.) is significantly greater. However, these same WiFi components lack contextual operational information associated with each wireless device, which could be advantageously used when making an AP recommendation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. One example of an intelligent connectivity operation is a context-aware access point (AP) selection operation, likewise described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
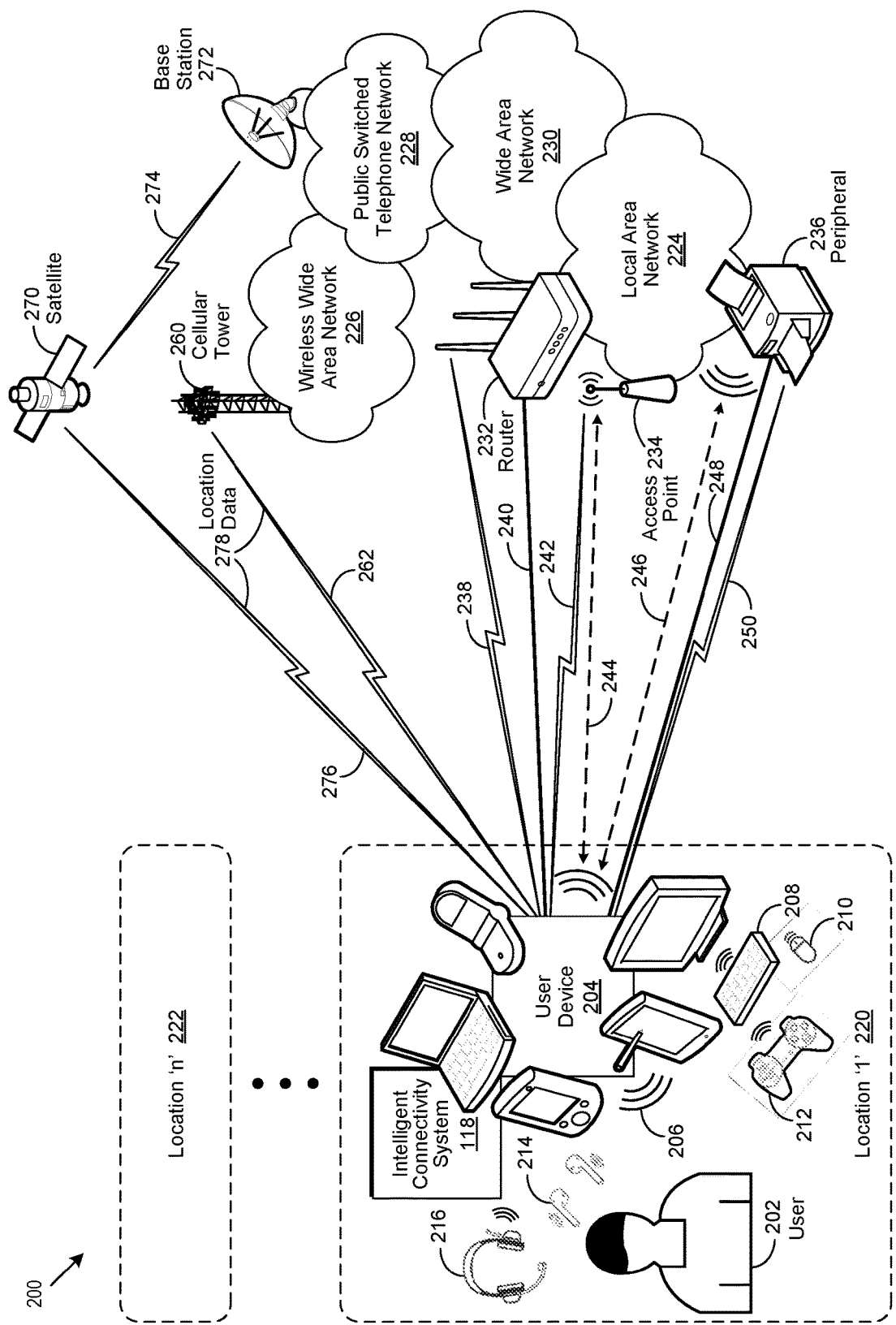
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204 is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276 may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which is typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1'→network tunnel '1', network traffic queue '2'→network tunnel '1', and network traffic queue '3'→no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
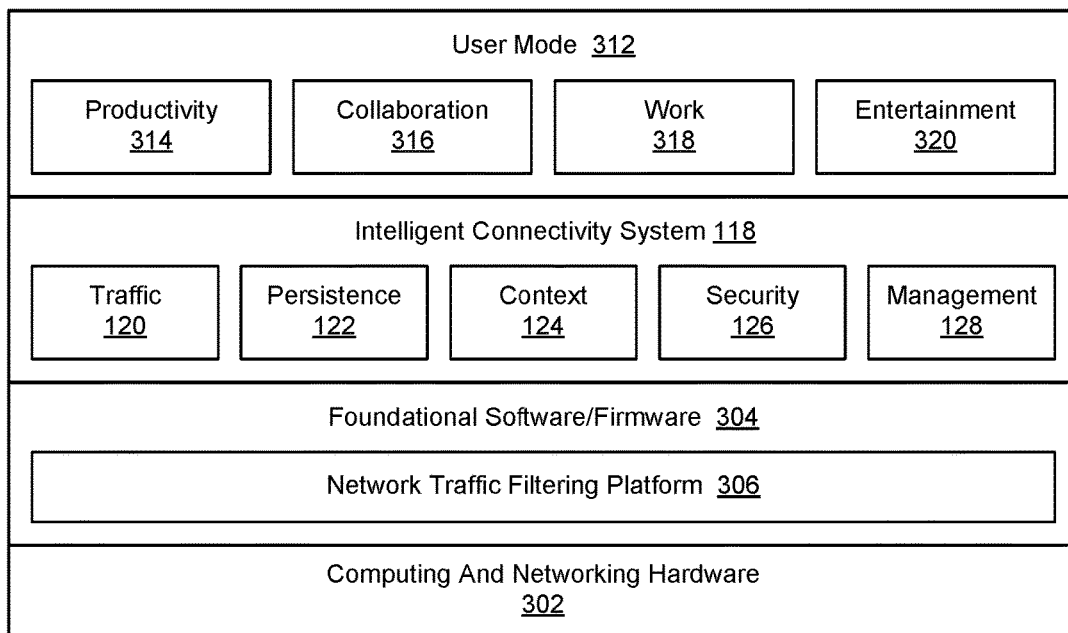
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a Windows® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered, she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
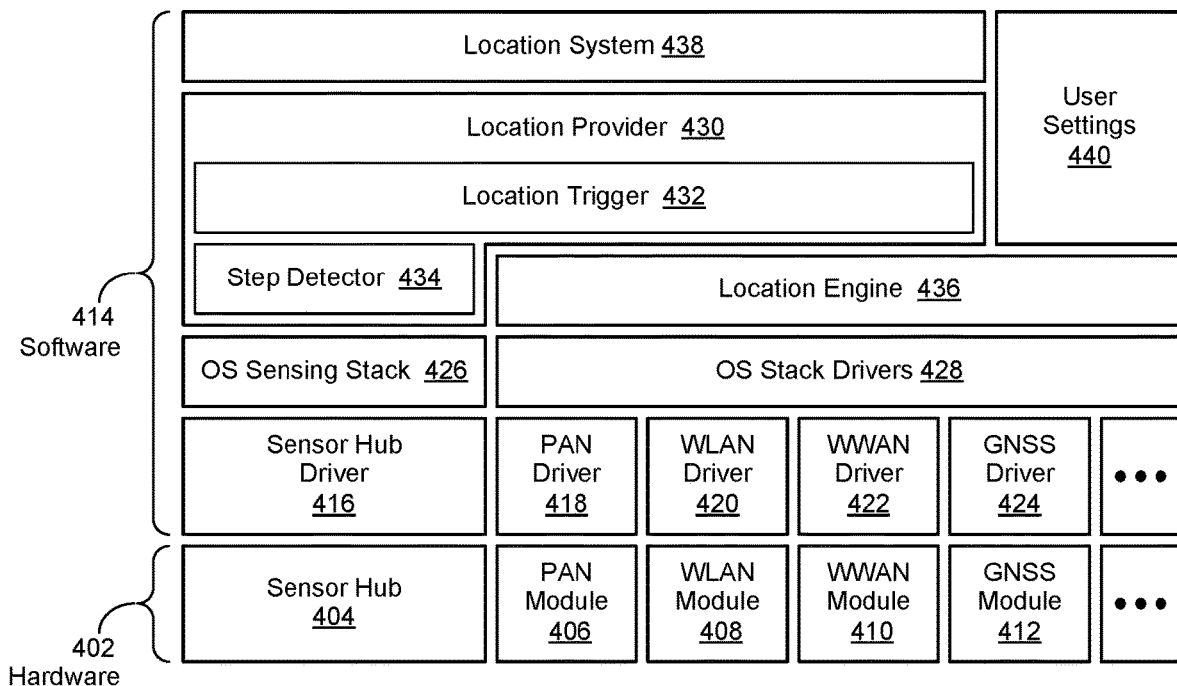
FIG. 4 shows hardware and software components used in the performance of a Bluetooth network connectivity persistence operation.

FIG. 4 shows hardware and software components used in the performance of a Bluetooth network connectivity persistence operation implemented in accordance with an embodiment of the invention. In various embodiments, a user device may be implemented with certain hardware 402 and software 414 components that it may use to determine its location and the location of certain network links, described in greater detail herein. In certain embodiments, the hardware components 402 may include a location sensor hub 404 module, a Personal Area Network (PAN) 406 module, a Wireless Local Area Network (WLAN) 408 module, a Wireless Wide Area Network (WWAN) 410 module, a Global Navigation Satellite System (GNSS) 412 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the INTEL® Integrated Sensor Hub (ISH).

In certain embodiments, the PAN 406 module may be implemented to communicate data through a network link to an associated PAN, described in greater detail herein. In certain embodiments, the WLAN 408 module may be implemented to communicate data through a network link to an associated WLAN, likewise described in greater detail herein. Likewise, as described in greater detail herein, the WWAN 410 module may be implemented in certain embodiments to communicate data through a network link to an associated WWAN. In various embodiments, as likewise described in greater detail herein, the GNSS 412 module may be implemented to receive certain Global Position System (GPS) data from a GPS satellite.

In certain embodiments, the software components 414 may include a sensor hub 416 driver, a PAN 418 driver, a WLAN 420 driver, a WWAN 422 driver, a GNSS 424 driver and so forth. In certain embodiments, the sensor hub 416, PAN 418, WLAN 420, WWAN 422, and GNSS 424 drivers may be implemented to respectively provide a programming interface to control and manage the sensor hub 404, PAN 406, WLAN 408, WWAN 410, and GNSS 412 modules. In certain embodiments, the software components 414 may likewise include an operating system (OS) sensing stack 426 and OS stack drivers 428 familiar to skilled practitioners of the art.

Likewise, in certain embodiments, the software components 414 may include a location engine 436. In certain embodiments, the location engine 436 may be implemented to perform a location determination operation. As used herein, a location determination operation broadly refers to any operation performed to determine the location of a user device, and the location of an available network, and the distance between the two.

In certain embodiments, the software components 414 may likewise include a location provider 430 module. In certain embodiments, the location provider 430 module may be implemented to include a location trigger 432 sub-module, or a step detector 434 sub-module, or both. In various embodiments, the location trigger 432 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 432 sub-module may be implemented to generate an alert when an associated user device approaches the boundaries of a particular geo-fence. In certain embodiments, the step detector 434 sub-module may be implemented to measure individual steps a user may make in the course of using a particular user device. In various embodiments, the step detector 434 sub-module may be implemented to use certain information provided by a motion sensor, or accelerometer, or both, to make such user step measurements.

In various embodiments, the location trigger 432 sub-module and the step detector 434 sub-module may be implemented, individually or in combination, to provide certain location information they may generate to the location provider 430 module. In various embodiments, the location provider 430 module may be implemented to generate location information for use by software applications executing on a user device. In certain embodiments, the location provider 430 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 430 module may be implemented to use certain location information provided by the location trigger 432 and step detector 434 sub-modules to provide location information for use in a location network tag (LNT), described in greater detail herein. One known example of a location provider 430 module is the Windows® Location Provider®, familiar to those of skill in the art.

In certain embodiments, the software components 414 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 430, or LNT information it may generate, in the use of such AI and ML approaches.

In certain embodiments, the software components 414 may likewise include a user settings 440 module. In certain embodiments, the user settings 440 module may be implemented to store certain network connectivity settings associated with a user of a user device. Skilled practitioners of the art will recognize that many such embodiments are possible. Accordingly, the foregoing is not intended to limit the spirit, scope, or intent of the invention.

FIGS. 5*a* through 5*d* show an example of context-aware access point (AP) selection operations implemented in accordance with an embodiment of the invention. As used herein, a context-aware AP selection operation broadly refers to any operation whose performance may assist a mobile device in selecting an available AP based upon certain context-aware information associated with the operation of the wireless device and certain wireless network infrastructure operational information associated with two or more available APs. As used herein, context-aware information broadly refers to any information directly or indirectly associated with the operation of a wireless device for a particular purpose, by a particular user, at a particular time, at a particular location, or a combination thereof, within a wireless network infrastructure.

In certain embodiments, the context-aware information may include operational information related to whether the mobile device is in an active or dormant mode. As an example, a laptop computer may be in a dormant mode when its lid is closed, but in an active mode when its lid is opened and its screen is displayed. In certain embodiments, the context-aware information may include operational information related to a change in the mobile device's rotational angle. To continue the previous example, depending upon the location of its antennas, a laptop's antenna performance and beam pattern may change when it is opened or closed, or rotated on one axis or another, or a combination thereof. Accordingly, one AP or another may provide better performance.

In certain embodiments, the context-aware information may include operational information related to the mobile device's power management status. As an example, it is common for mobile devices to monitor various aspects of its power management status, whereby an average power consumption level is typically defined for each of its components. In this example, the power consumed by a Wi-Fi module may be monitored, with the stipulation it not exceed a certain level. Accordingly, such a stipulation may be considered when selecting a particular AP, which frequency band it may support, and which channel is selected for use, based upon estimated throughput capacity and power consumption according to the volume of network traffic amount and the transmission power involved.

In certain embodiments, the context-aware information may include operational information related to the user of the mobile device entering, or exiting, a non-interrupt mode. As an example, a user may use a user device to make a presentation during a meeting. In this example, switching from one AP, or frequency band, or both, may be disruptive during the presentation as it may cause one or more intermittent delays when the presentation is being made. Accordingly, the user may use the mobile device in a non-interrupt mode to prevent such interruptions. However, it is possible that the transmission quality of a selected AP may deteriorate beneath a certain threshold of acceptability during the presentation.

In certain embodiments, the threshold of acceptability may be associated with network throughput, latency, congestion, and so forth. Accordingly, a threshold level may be set in various embodiments, whereby the non-interrupt mode is overridden to maintain a certain level of transmission quality during the presentation by switching to another AP. In these embodiments, the value of the threshold level, the method by which it is monitored, and the subsequent action that may be taken if it is reached, or a combination thereof, is a matter of design choice.

In certain embodiments, the context-aware information may include operational information related to whether or not a user is directly or indirectly engaged, or not, in the operation of a particular mobile device. As an example, a user may initiate an application to run on a mobile device at a particular location for a particular period of time. In this example, a certain level of network traffic may be communicated between the mobile device and a particular AP while the user is directly engaged in using the application executing on the mobile device. However, at some point in time the user may cease to directly engage in using the application, yet leave the application running on the mobile device. Accordingly, the volume of traffic communicated between the mobile device and the AP may decrease significantly, and as a result, reduce the need for a high capacity wireless connection, which in turn could lead to a decision to switch to an AP providing a lower capacity wireless connection.

In certain embodiments, the context-aware information may include operational information related to a significant change in the volume of network traffic communicated between a mobile device and a particular AP during execution of an online, interactive application. As an example, a user may use a mobile device to participate in an online game executing in a cloud environment. In this example, the user may cease actively playing the game at some point in time, resulting in the streaming of the game being slowed or paused completely. However, at the same time, the user may use a chat window to continue communicating with other players. To continue the example, the cessation, or pausing, of the gaming stream indicates that a low-latency wireless connection may no longer be needed, and as a result, a moderate-latency wireless connection may be selected instead.

In certain embodiments, the context-aware information may include operational information related to initiating a previously-scheduled application requiring a particular level of network traffic throughput at a particular point in time. As an example, a video call may be scheduled at a particular time for a particular mobile device, and as a result, a particular AP capable of supporting the needs of the videoconference needs to be selected over one that is not capable of providing the desired throughput and latency levels for the videoconference. In certain embodiments, wireless network infrastructure operational information may be associated with a Wireless Local Area Network (WLAN), such as a Wireless Fidelity (WiFi) network, or a Wireless Wide Area Network (WWAN), such as a 3G/4G/5G cellular network, or a combination thereof, as described in greater detail herein. In various embodiments, as likewise described in greater detail herein, the wireless network infrastructure operational information may include certain frequency band and channel information, such as congestion, signal strength, latency, throughput, and so forth.

In various embodiments, a holistic decision balancing operation may be performed when selecting a particular AP, frequency band, and channel. In certain embodiments, the holistic decision balancing operation may be performed by balancing the advantages and disadvantages of recommendations respectively provided by a network infrastructure component and recommendations made by an intelligent connectivity system implemented on the user device. In various embodiments, the recommendations provided by the network infrastructure component may be based upon certain network infrastructure operational information and the recommendations provided by the intelligent connectivity system may be based upon certain context-aware information. In various embodiments, the context-aware information may include certain information associated with the status of the user device, as described in greater detail herein.

In various embodiments, the user device may be implemented with an intelligent connectivity system, but is unable to receive and process recommendations provided by a network infrastructure component. In certain of these embodiments, the selection of a particular AP is made based upon the recommendations provided by the intelligent connectivity system. In various embodiments, the user device may not be implemented with an intelligent connectivity system, but is able to receive and process recommendations provided by a network infrastructure component. In certain of these embodiments, the selection of a particular AP is made based upon the recommendations provided by the network infrastructure component.

In various embodiments, the user device may be implemented with an intelligent connectivity system, and is likewise able to receive and process recommendations provided by a network infrastructure component. In various embodiments, the selection of a particular AP is made based upon recommendations provided by both the intelligent connectivity system and the network infrastructure component. In certain of these embodiments, the intelligent connectivity system may be implemented to perform a holistic decision balancing operation by processing the recommendations made by itself and the network component to recommend the selection of a particular AP. In these embodiments, the method by which the intelligent connectivity system performs the holistic decision balancing operation, and the information used to perform it, is a matter of design choice.

In various embodiments, AP selection recommendations provided by an intelligent connectivity system implemented on the user device and those provided by a network infrastructure component may be different. In various embodiments, certain triggering event information may be used to determine which recommendation to follow. As used herein, triggering event information broadly refers to certain context-aware information associated with changes within a network infrastructure, changes in the operational status of the user device, changes in a user's interaction with the user device, or a combination thereof. In various embodiments, the triggering information may be associated with a change in the network infrastructure, such as an abrupt deterioration of throughput, or an increase in latency, or both, for a current connection to a particular AP. In certain embodiments, the abrupt deterioration may be caused by change in the location of the user device, channel congestion, interference caused by passers-by, APs becoming heavily loaded by other users, and so forth.

In various embodiments, the triggering information may be associated with a change in the user device's context. In various embodiments, the change in the user device's context may be caused by certain factors, such as a laptop's lid being opened or closed, a change in its power management status, entering or exiting a non-interrupt mode, scheduled initiation of an application requiring sizable amounts of network bandwidth, and so forth. In various embodiments, the triggering information may be associated with a change in the behavior of a user device's user. In certain embodiments, such changes in behavior may be caused by a user engaging or disengaging with the user device, a significant decrease in the amount of outgoing network traffic, and so forth. Those of skill in the art will recognize that many such embodiments are possible. Accordingly, the foregoing is not intended to limit the spirit, scope or intent of the invention.

In various embodiments, a network infrastructure connection decision may be made to connect a user device to a particular AP, frequency band, and channel, based upon the triggering event information. In various embodiments, the network infrastructure connection decision may be made if the expected behavior of the user device is majorly triggered by a change in the quality of a current connection to an AP. As used herein, majorly triggering broadly refers to a triggering condition causing a significant effect on the performance of a network link to a particular AP. As an example, congestion on a particular AP channel may cause a decrease in throughput of forty percent or more.

In certain embodiments, the user device may defer to a network infrastructure connection decision provided by the network infrastructure component when the expected behavior of the user device is majorly triggered by certain changes in network link quality characteristics. In certain embodiments, the user device may defer to a network infrastructure connection decision provided by an intelligent connectivity system implemented on the user device when the expected behavior of the user device is majorly triggered by a change in the user device's context-aware information. In certain embodiments, the user device may defer to a network infrastructure connection decision provided by an intelligent connectivity system implemented on the user device when the expected behavior of the user device is majorly triggered by a change in the behavior of the user of the user device.

Referring now to FIGS. 5a through 5d, a WiFi environment 500 may include AP '1' 502, which operates in the 2.4 GHz frequency band and is moderately loaded, and AP '2'

504, which operates in the 6 GHz frequency band and is lightly loaded. As likewise shown in FIGS. 5a through 5d, the WiFi environment 500 includes an AP '1' coverage area 512 and an AP '2' coverage area 514 respectively corresponding to APs '1' 502 and 'B' 504. In this example, users 'A' 522, 'B' 524, 'C' 526, and 'D' 528 are respectively associated with user devices 'A' 532, 'B' 534, 'C' 536, and 'D' 538, each of which is capable of communicating with AP '1' 502 and AP '2' 504 within their respective coverage areas 512 and 514. In various embodiments, each of the user devices 'A' 532, 'B' 534, 'C' 536, and 'D' 538 may be implemented with an intelligent connectivity system, described in greater detail herein. In certain of these embodiments, the intelligent connectivity system implemented on the user devices 'A' 532, 'B' 534, 'C' 536, and 'D' 538, individually or in combination with one another, may likewise be implemented to perform a context-aware AP selection operation, described in greater detail herein.

Figure 5A:
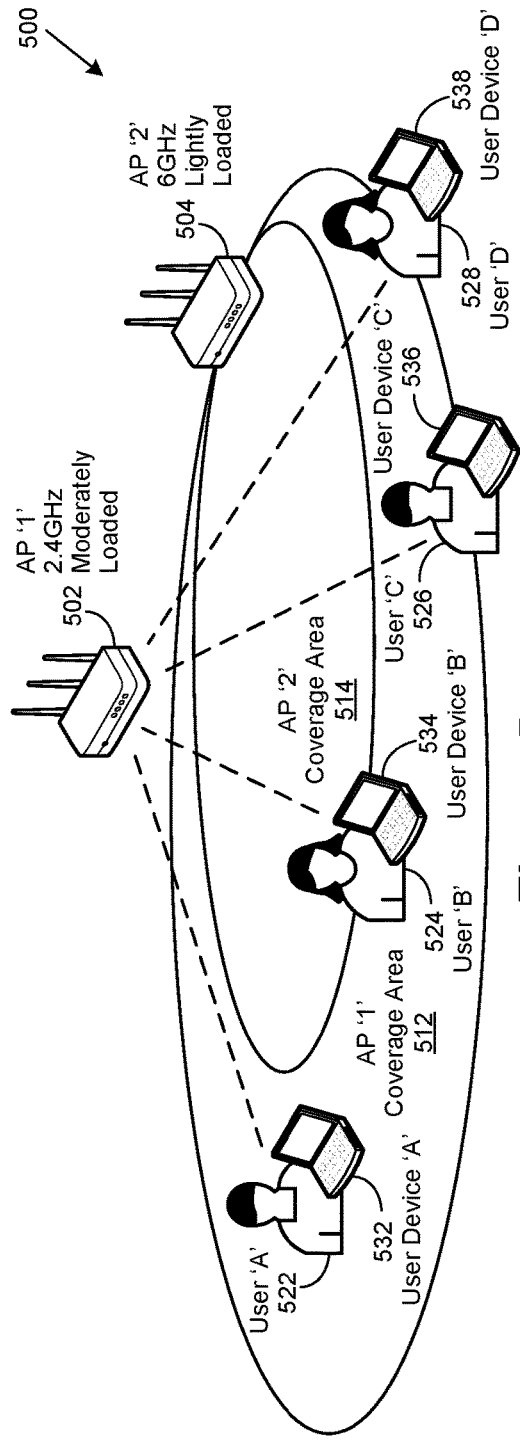
Figure 5B:
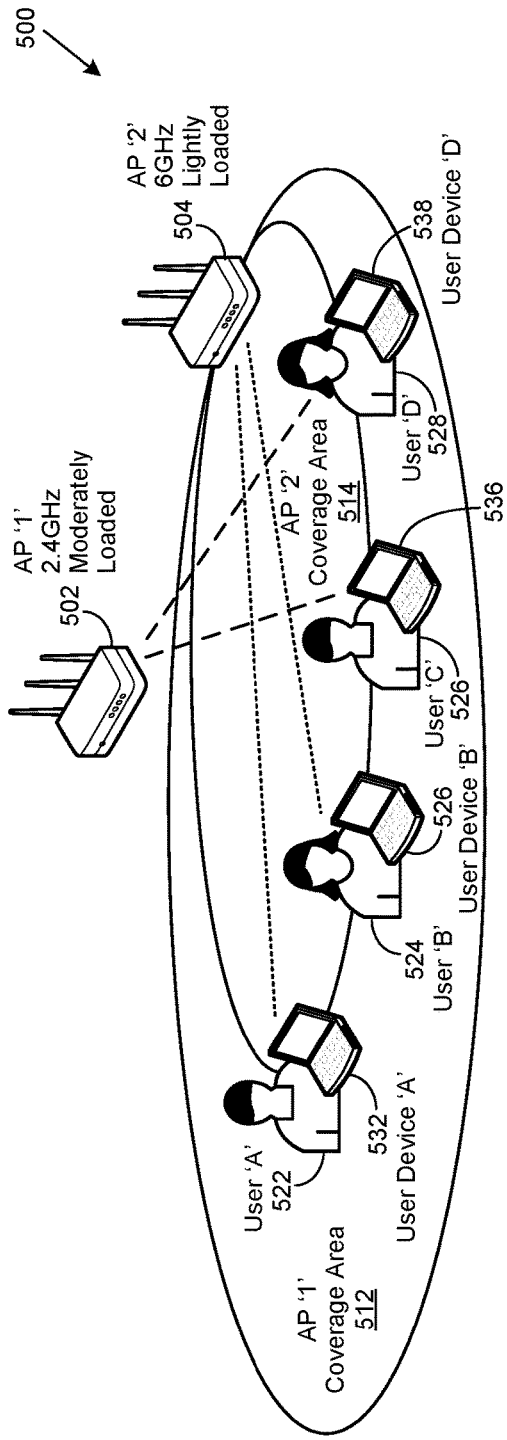

To continue the example, as shown in FIG. 5a, users 'A' 522, 'B' 524, 'C' 526, and 'D' 528 meet in a meeting room, which is serviced by both AP '1' 502 and AP '2' 504, and respectively initiate their user devices 'A' 532, 'B' 534, 'C' 536, and 'D' 538 for wireless communication. As a result, each user device 'A' 532, 'B' 534, 'C' 536, and 'D' 538 initially establishes communication with AP '1' 502 due to its greater range of coverage, Shortly thereafter, users 'A' 522, 'B' 524, 'C' 526, and 'D' 528 each receive a recommendation from their respective user devices 'A' 532, 'B' 534, 'C' 536, and 'D' 538 to switch to AP '2' 504 to avoid possible WiFi channel conflicts. However, as shown in FIG. 5b, the WiFi controller monitoring the WiFi infrastructure 500 then sends a conflicting recommendation to users 'A' 522 and 'B' 524 that they should switch to AP '2' 504, while users 'C' 526 and 'D' 528 should remain connected to AP '1' 502 for balanced channel loading conditions.

From the foregoing, it will be apparent to skilled practitioners of the art that users 'C' 526 and 'D' 528 are receiving conflicting recommendations regarding whether to use AP '1' 502 or AP '2' 504. Regardless, to continue the example, user 'C' 526 may use his user device 'C' 536 to communicate with AP '1' 502 to display a presentation on a 4K monitor. At some point during the presentation, as shown in FIG. 5c, user 'A' 522 leaves the WiFi environment 500 with their user device 'A' 532. As a result, the WiFi controller monitoring the WiFi infrastructure 500 sends a recommendation to user 'C' 536 to switch to AP '2' 504, which is no longer communicating with user device 'A' 532, to optimize network capacity utilization. However, because the WiFi controller is unaware of the context of how user 'C' 526 is using their user device 'C' 536, the recommendation is irrelevant. Furthermore, following the recommendation to switch to AP '2' 504 would needlessly interrupt the presentation being made by user 'C' 526.

To continue the example further, as shown in FIG. 5d, user 'A' 522 may leave the WiFi environment 500 but leave their user device 'A' 532 behind in a dormant or idle mode. As a result of not understanding the context of whether or not user device 'A' 536 is being actively used by user 'A' 526, AP '2' 504 continues to dedicate a communications channel to user device 'A' 536, even though it is only being used to passively receive WiFi beacons. Those of skill in the art will recognize that many such examples of context-aware AP selection operations are possible. Accordingly, the foregoing is not intended to limit the spirit, scope, or intent of the invention.

FIG. 6 shows a table of context changes and associated context-aware access point (AP) selection operations implemented in accordance with an embodiment of the invention. In certain embodiments, as described in greater detail herein, contextual changes 602 associated with a user device may result in a corresponding context-aware AP selection operation 632, likewise described in greater detail herein. For example, as shown in FIG. 6, a mechanical change associated with a particular user device, such as a laptop's lid being opened or closed 604, may result the use of directional information to make recommendations to use a particular AP. As another example, changes in a platform's power management status 606, such as a mobile device's battery level reaching a certain threshold, may result in making adjustments for power consumption and network throughput, as well as making recommendations to use a particular AP.

As yet another example, being in an existing non-interrupt mode, or initiating one 608, as described in greater detail herein, may result in updating a particular threshold value, such as an AP score, for change. As yet still another example, a user disengaging from using a device 610 may result in using associated network throughput information to make recommendations to use a particular AP, as described in greater detail herein. As another example, an interactive application may be in progress 612, which may result in using information associated with the application to make recommendation to use a particular AP. As yet another example, being in an existing application, or initiating one, that requires higher network throughput 614 may result in using information associated with the network throughput to make recommendation to use a particular AP.

Figure 7A:
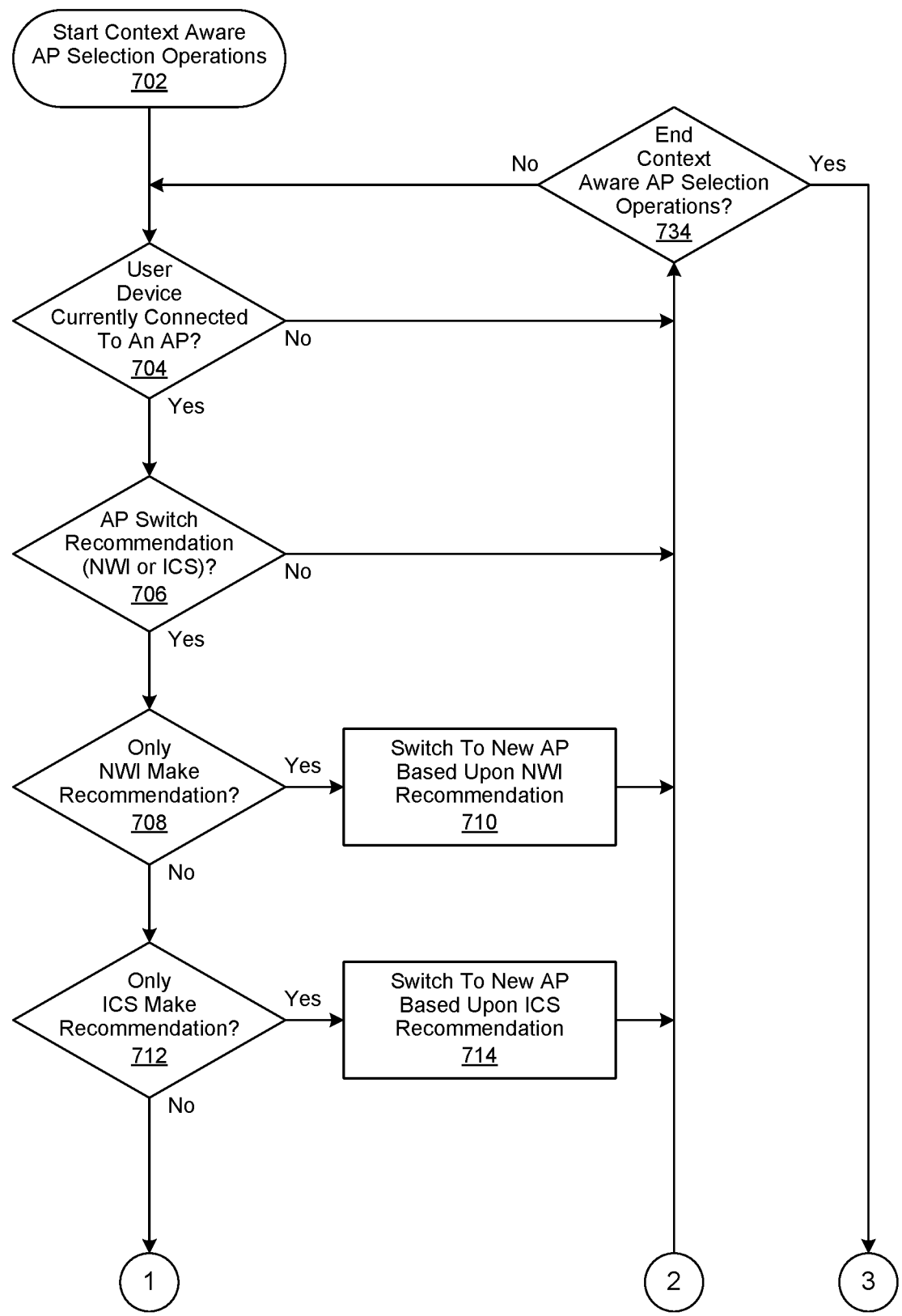
FIGS. 7a and 7b show a flowchart of the performance of context-aware AP selection operations.
Figure 7B:
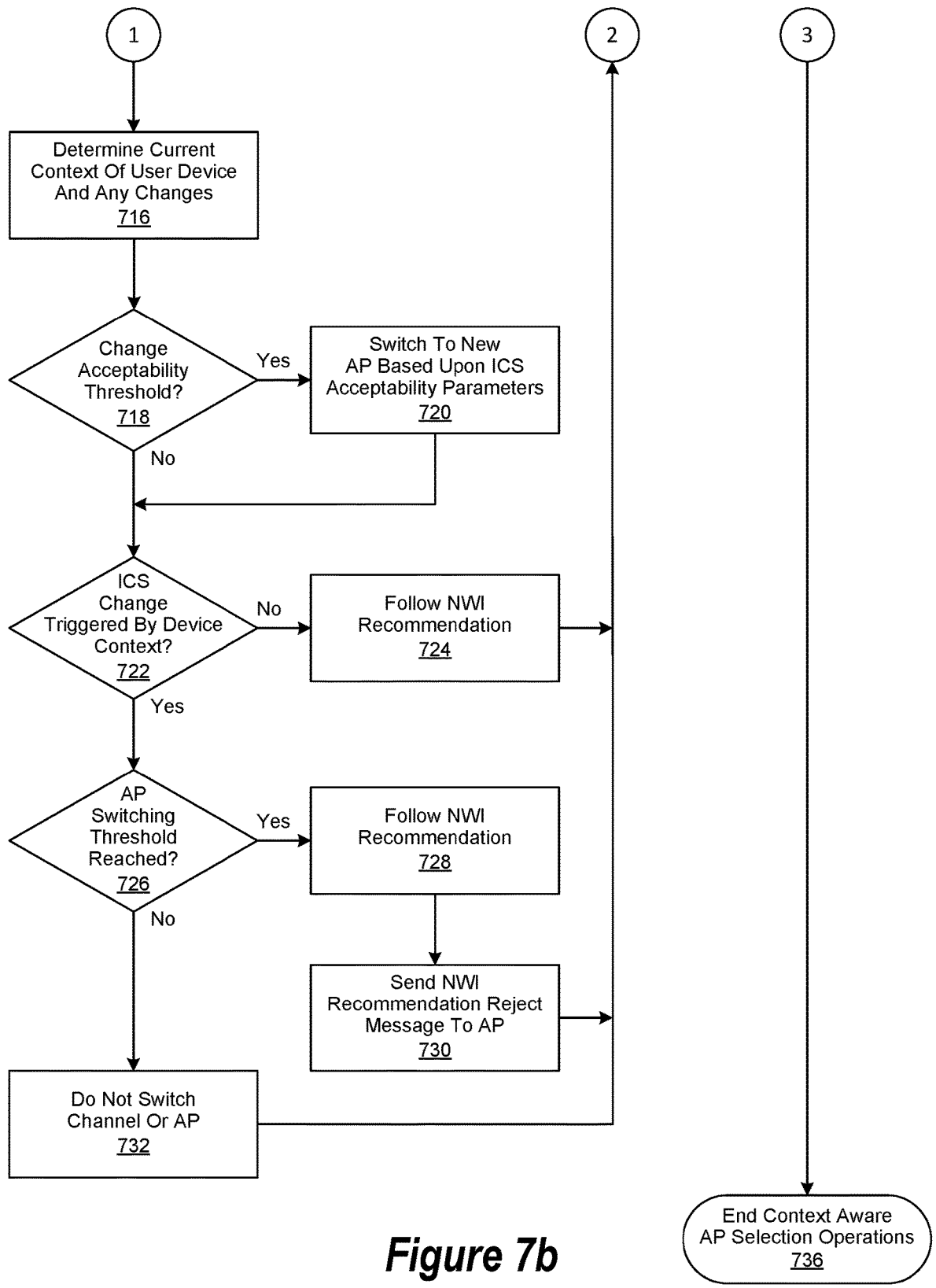

FIGS. 7a and 7b show a flowchart of the performance of context-aware access point (AP) selection operations implemented in accordance with an embodiment of the invention. In this embodiment, context-aware AP operations are begun in step 702, followed by a determination in step 704 whether a particular user device is currently connected to a particular AP. If not, then a determination is made in step 732 whether to end context-aware AP selection operations. If so, then context-aware selection operations are ended in step 734. Otherwise, the process is continued, proceeding with step 704.

However, if it was determined in step 704 that the user device is currently connected to an AP, then a determination being made in step 706 whether or not an AP switch recommendation has made by either a network infrastructure (NWI) component or an intelligent connectivity system (ICS), as described in greater detail herein. If not, then the process is continued, proceeding with step 734. Otherwise, a determination is made in step 708 whether the recommendation was made by a component of the network infrastructure. If so, then the user device's current connection to an AP is switched to the AP recommended by the NWI component in step 710, and the process is continued, proceeding with step 734.

Otherwise, a determination is made in step 712 whether the recommendation was made by an ICS. If so, then the user device's current connection to an AP is switched to the AP recommended by the ICS in step 714, and the process is continued, proceeding with step 734. Otherwise, the current context of the user device is determined in step 716 and whether there have been any changes since it connected to the original AP. A determination is then made in step 718 whether to change the user device's acceptability threshold, described in greater detail herein. If so, then the user device's AP connection is switched in step 720 to a new AP, based upon the ICS's acceptability threshold parameters.

Thereafter, or if it was determined in step 718 that the threshold has not changed, a determination is made in step 722 whether the recommendation by the ICS was triggered by a change in the context of the user device. If not, then the recommendations made by the NWI component are followed by the user device in step 724, and the process is continued, proceeding with step 734. Otherwise, a determination is made in step 726 whether an AP switching threshold has been reached. If so, then the recommendations made by the NWI are followed in step 728, followed by an NWI recommendation reject message being sent to the new AP in step 730, and the process is continued, proceeding with step 734. Otherwise, the user device's connection to its current AP, or its current channel, is not switched in step 732, and the process is continued, proceeding with step 734.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an intelligent connectivity operation, comprising:
    identifying context-aware information associated with an information handling system, the context-aware information comprising information identifying a context in which the information handling system is being used;
    identifying network infrastructure operational information, the network infrastructure operational information including wireless network infrastructure operational information associated with available access points (APs); and,
    selecting an access point and a channel within the network infrastructure for use by the information handling system based upon the context-aware information and the network infrastructure operational information.

2. The method of claim 1, wherein:
    the context-aware information associated with the information handling system comprises at least one of lid status information, power management status information, usage information, and movement information.

3. The method of claim 1, further comprising:
    identifying user wireless consumption capacity; and,
    selecting the access point and the channel includes taking the wireless consumption capacity into account.

4. The method of claim 1, wherein further comprising:
performing a holistic decision balancing operation when selecting the access point and the channel, the holistic decision balancing operation being based upon a context assisted smart connect status of the information handling system and a wireless network infrastructure operational information of the network infrastructure.

5. The method of claim 1, further comprising:
identifying triggering event information associated with context-aware information, the context-aware information comprising at least one of link quality characteristics, device contexture information and user behavior information.

6. The method of claim 5, wherein:
the access point and the channel within the network infrastructure are selected based upon the triggering event information, the selecting deferring to a network infrastructure connect decision when an expected behavior of the information handling system is majorly triggered by the link quality characteristics, the selecting deferring to a contexture assisted smart connect decision when an expected behavior of the information handling system is majorly triggered by a change in one of device contexture information and user behavior information.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying context-aware information associated with an information handling system, the context-aware information comprising information identifying a context in which the information handling system is being used;
identifying network infrastructure operational information, the network infrastructure operational information including wireless network infrastructure operational information associated with available access points (APs); and,
selecting an access point and a channel within the network infrastructure for use by the information handling system based upon the context-aware information and the network infrastructure operational information.

8. The system of claim 7, wherein:
the context-aware information associated with the information handling system comprises at least one of lid status information, power management status information, usage information, and movement information.

9. The system of claim 7, wherein the instructions executable by the processor are further configured for:
identifying user wireless consumption capacity; and,
selecting the access point and the channel includes taking the wireless consumption capacity into account.

10. The system of claim 7, wherein the instructions executable by the processor are further configured for:
performing a holistic decision balancing operation when selecting the access point and the channel, the holistic decision balancing operation being based upon a context assisted smart connect status of the information handling system and a wireless network infrastructure operational information of the network infrastructure.

11. The system of claim 7, wherein the instructions executable by the processor are further configured for:
identifying triggering event information associated with context-aware information, the context-aware information comprising at least one of link quality characteristics, device contexture information and user behavior information.

12. The system of claim 11, wherein:
the access point and the channel within the network infrastructure are selected based upon the triggering event information, the selecting deferring to a network infrastructure connect decision when an expected behavior of the information handling system is majorly triggered by the link quality characteristics, the selecting deferring to a contexture assisted smart connect decision when an expected behavior of the information handling system is majorly triggered by a change in one of device contexture information and user behavior information.

13. A non-transitory, computer-readable storage medium embodying computer program code, the computer program code comprising computer executable instructions configured for:
identifying context-aware information associated with an information handling system, the context-aware information comprising information identifying a context in which the information handling system is being used;
identifying network infrastructure operational information, the network infrastructure operational information including wireless network infrastructure operational information associated with available access points (APs); and,
selecting an access point and a channel within the network infrastructure for use by the information handling system based upon the context-aware information and the network infrastructure operational information.

14. The non-transitory, computer-readable storage medium of claim 13, wherein:
the context-aware information associated with the information handling system comprises at least one of lid status information, power management status information, usage information, and movement information.

15. The non-transitory, computer-readable storage medium of claim 13, wherein computer executable instructions are further configured for:
identifying user wireless consumption capacity; and,
selecting the access point and the channel includes taking the wireless consumption capacity into account.

16. The non-transitory, computer-readable storage medium of claim 15, wherein computer executable instructions are further configured for:
performing a holistic decision balancing operation when selecting the access point and the channel, the holistic decision balancing operation being based upon a context assisted smart connect status of the information handling system and a wireless network infrastructure operational information of the network infrastructure.

17. The non-transitory, computer-readable storage medium of claim 13, wherein computer executable instructions are further configured for:
identifying triggering event information associated with context-aware information, the context-aware information comprising at least one of link quality characteristics, device contexture information and user behavior information.

18. The non-transitory, computer-readable storage medium of claim 17, wherein:
the access point and the channel within the network infrastructure are selected based upon the triggering event information, the selecting deferring to a network infrastructure connect decision when an expected behavior of the information handling system is majorly triggered by the link quality characteristics, the selecting deferring to a contexture assisted smart connect decision when an expected behavior of the information handling system is majorly triggered by a change in one of device contexture information and user behavior information.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

\* \* \* \* \*